Dec. 1, 1970   L. S. RAISCH ET AL   3,543,551
APPARATUS FOR HELICALLY CORRUGATING METAL TUBING
Filed March 5, 1968   5 Sheets-Sheet 1
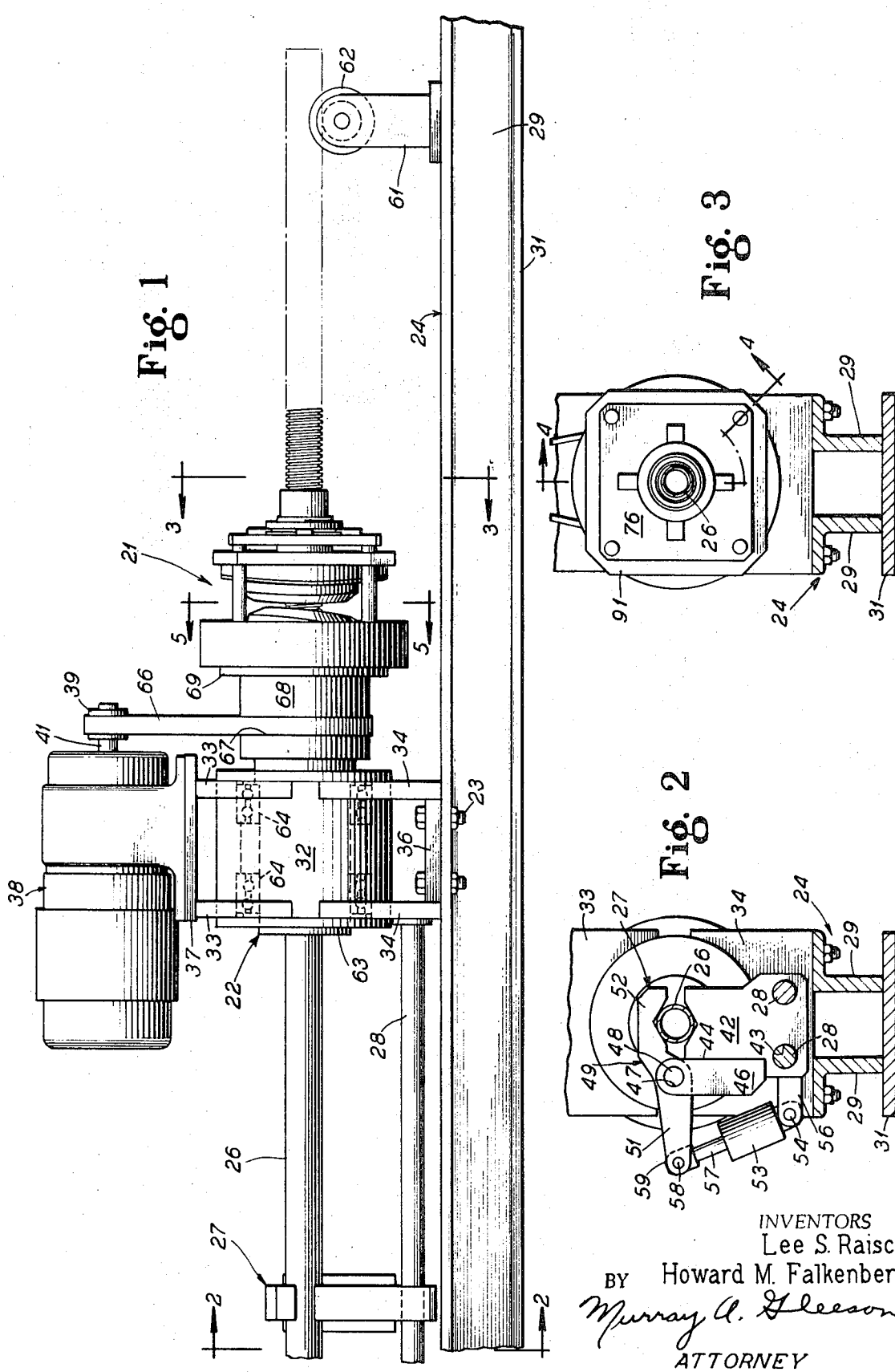
INVENTORS
Lee S. Raisch
Howard M. Falkenberg
BY Murray A. Gleeson
ATTORNEY

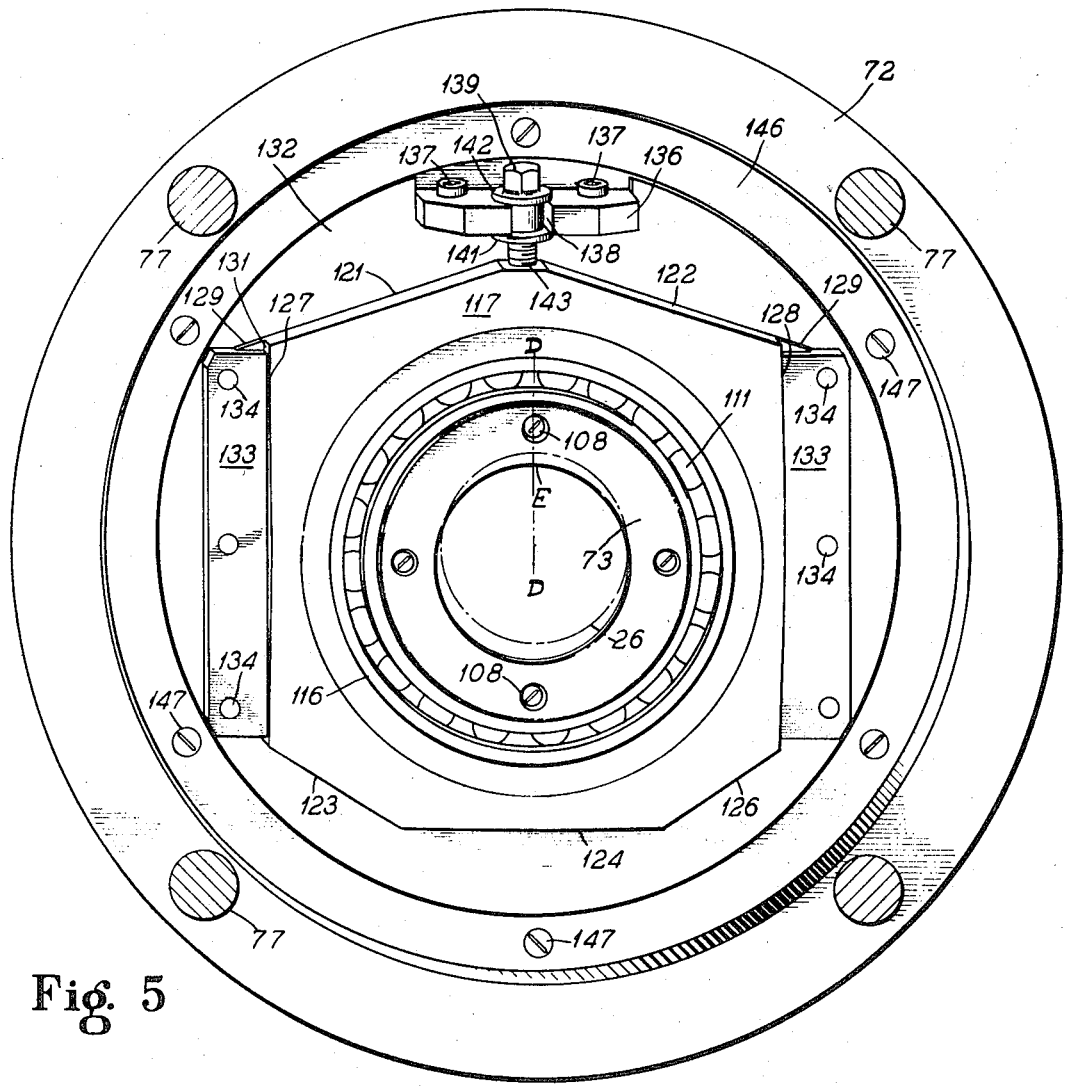

INVENTORS
Lee S. Raisch
BY Howard M. Falkenberg
Murray A. Gleeson
ATTORNEY

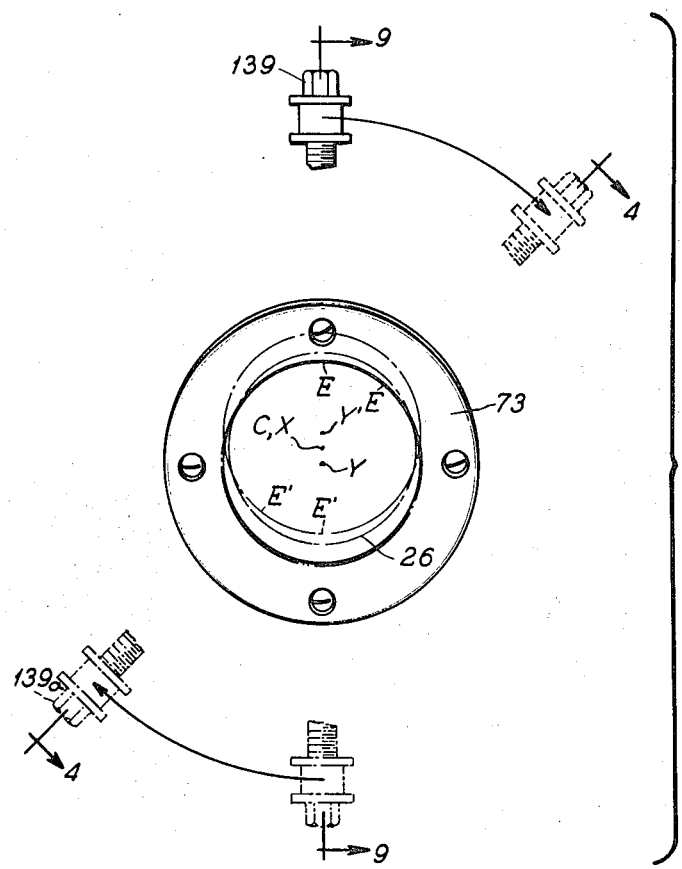
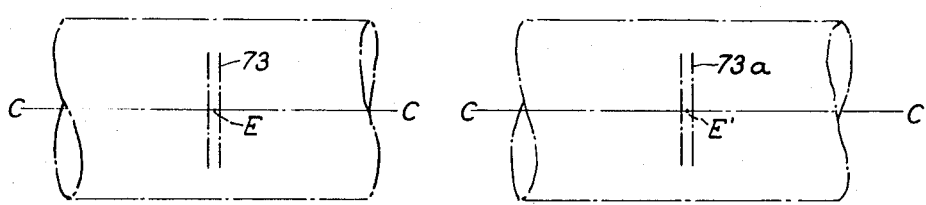
Fig. 11  Fig. 12
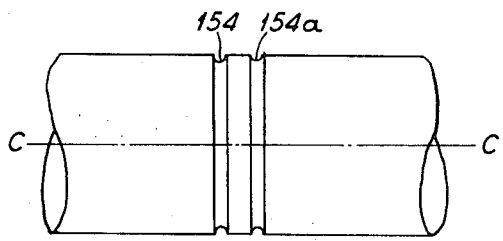
Fig. 13
Fig. 10
INVENTORS
Lee S. Raisch
BY Howard M. Falkenberg
Murray A. Gleeson
ATTORNEY United States Patent Office 3,543,551
Patented Dec. 1, 1970

3,543,551
APPARATUS FOR HELICALLY CORRUGATING METAL TUBING
Lee S. Raisch and Howard M. Falkenberg, Chicago, Ill., assignors to Universal Metal Hose Company, Chicago, Ill., a corporation of Delaware
Filed Mar. 5, 1968, Ser. No. 710,605
Int. Cl. B21b 13/20
U.S. Cl. 72—77                                                          16 Claims

ABSTRACT OF THE DISCLOSURE

Apparatus for continuously manufacturing helical corrugated tubing from straight wall tubing. A rotatable corrugating head has two adjustably spaced annular die rings eccentrically encompassing the tubing; and each die ring is circumferentially adjustable in a plane which is oblique to the tubing axis to modify the shape and to vary the pitch of the corrugation generated in the tubing.

BACKGROUND OF THE INVENTION

The field of invention is a machine for manufacturing helical corrugated tubing from straight wall tubing by the use of tools acting during relative rotation between the tools and the tubing about a center internal of the tubing.

According to conventional manufacturing practice, helically corrugated tubing is made from straight walled tubing by a helical die plate pressed against and rotated about the tubing. This is essentially a swiping operation requiring the sliding of die and tubing surfaces against one another at pressures high enough to permanently deform the tubing metal. When such apparatus is used on stainless steel tubing, and despite the application of copious quantities of lubricant, difficulties have been encountered with seizure or galling of the die plate and the tubing. And twisting or deforming of the tubing, which is generally thin-walled, often occurs.

As an alternative manufacturing practice, to obviate galling and seizure, it has been proposed to employ rolling dies but the problems of mounting the dies so they are angularly and eccentrically adjustable, and their spacing is adjustable, while making the assembly simple, economical, compact and strong, have never been met satisfactorily.

SUMMARY OF THE INVENTION

To minimize the tendency of seizure-prone metals, such as stainless steel, to bind and gall during the corrugating operation, dies which roll rather than slide, and dies of the largest practical radius should be used. In the present invention, annular die rings which encompass the tubing make it possible to use a large die radius in a compact head.

A primary object of the present invention is to provide appartus for helically corrugating metal tubing having rolling dies mounted to facilitate easy adjustment of the shape and pitch of the corrugation produced in the tubing.

A specific object of this invention is to provide apparatus for helically corrugating metal tubing in which a pair of annular die rings encompass the tubing at positions spaced along the tubing and each die ring is eccentrically adjustable in a plane oblique to the tubing axis to modify the corrugation produced in the tubing.

Another object of the present invention is to provide, in apparatus for helically corrugating metal tubing, a freely rotatable, tubing-encompassing annular die ring mounted in a plane which is oblique to the tubing axis and having an eccentric tubing-engaging periphery portion located in the oblique plane to thereby generate a helical corrugation when the head is rotated relative to the tubing.

Another object of the present invention is to provide, in apparatus for helically corrugating metal tubing, a freely rotatable annular die ring encompassing the tubing and being mounted in a plane which is oblique to the tubing axis and having means for varying the eccentricity of the die ring in different directions in that oblique plane to thereby vary the shape and pitch of the helical corrugation produced in the tubing.

Another object is the provision of helical corrugating apparatus for metal tubing having first and second annular die rings mounted in a head for rotation relative to a length of metal tubing, both die rings being disposed in planes which are oblique to the tubing axis and each having a tubing-engaging periphery portion which is mounted for both eccentric and circumferential adjustment about the tubing in its respective oblique plane, to produce in the wall of the tubing a helical corrugation of preselected shape, depth and pitch.

Other objects and advantages will be apparent from the following description taken in connection with the figures of the drawings in which:

FIG. 1 is a schematic side view of a helical corrugating apparatus for metal tubing made in accordance with the present invention;

FIG. 2 is a cross sectional view of the apparatus taken along line 2—2 of FIG. 1;

FIG. 3 is a cross sectional view of FIG. 1 taken along line 3—3;

FIG. 5 is an enlarged cross sectional view of FIG. 1 taken along line 5—5, and it is also a cross sectional view of FIG. 4 taken along the line 5—5;

FIG. 6 is a fragmentary enlarged schematic view showing the angular relationship between the first annular die ring and the tubing, as seen in the direction of arrows 6—6 in FIG. 4;

FIG. 7 is a fragmentary enlarged schematic view showing the angular relationship between the second annular die ring and the tubing, as seen in the direction of arrows 7—7 of FIG. 4;

FIG. 10 is a partial cross sectional view of FIG. 9 taken in the direction of arrows 10—10;

Figure 4:
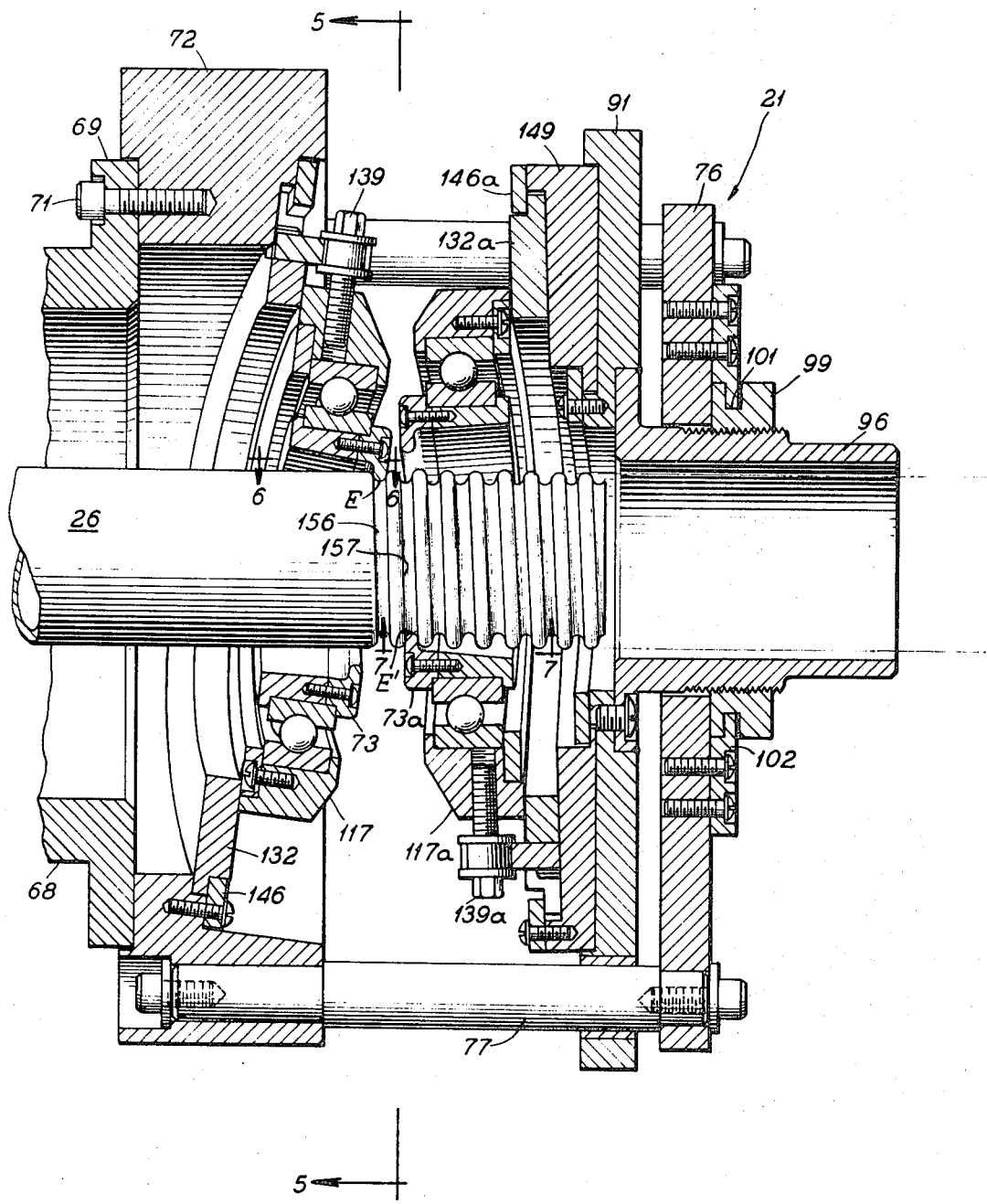
FIG. 4 is an enlarged, fragmentary, longitudinal cross sectional view of FIG. 3 taken on the line 4—4 showing one operative internal arrangement of annular die rings in the corrugating head while making helical corrugated tubing.

FIGS. 11 and 12 are similar to FIGS. 6 and 7 respectively; FIG. 11 being taken in the direction of line 11—11 of FIG. 9 and showing the angular relationship between the first annular die ring and the tubing; and FIG. 12 being taken along the line 12—12 of FIG. 9 and showing the angular relationship between the second annular die ring and the tubing; and FIG. 13 is an external view of the tubing showing the type of corrugation which would be produced by rotating the corrugating head as set in FIG. 9 about the tubing.

Like parts are indicated by like reference characters throughout the drawings.

Referring now in detail to the dawings, they show helical corrugating apparatus for metal tubing constructed in accordance with one preferred embodiment of the invention, including a corrugating head 21 rotatable within a journal support 22 mounted as by bolts 23 atop an elongated main frame 24. A length of thin wall metal tubing 26 moves to the right in FIG. 1, being held against rotation by clamp carriage 27 which moves along a pair of slide rods 28, 28.

As best shown in FIGS. 2 and 3, the main frame 24 consists of a pair of angle bars 29 welded on a base plate 31.

The journal support or frame 22 comprises a tubular body 32, upper and lower pairs of brackets 33 and 34, a base plate 36 fastened by the above-mentioned bolts 23, and an upper platform 37 supporting a gear head motor 38 with a driving pulley 39 on an output shaft 41.

The clamp carriage 27 comprises an upstanding transverse anvil plate 42 with two slide openings 43, slideably embracing the guide rods 28 which are fastened to the journal frame 22 on one of the lower brackets 34. On the anvil plate 42, mounted along the left-hand edge as shown in FIG. 2, is a trunnion 44 consisting of a pair of upstanding, vertically elongated plates 46 welded on both sides thereof and having a pair of aligned upper holes 47 for a pivot pin 48. A lever 49 with an arm 51 and a jaw 52 is pivoted at its midportion on the pin 48. A hydraulic cylinder 53 is connected by pivot pin 54 to an offset gudgeon 56 at the base of plate 42. A piston rod 57 extending from the cylinder 53 is connected by pivot pin 58 to an outer clevis portion 59 of lever arm 49. A suitable source of fluid pressure (not shown) actuates the cylinder 53 to clamp the tubing 26 between jaw and anvil 52, 42. Thus clamped, the tubing is held nonrotatable while the clamp carriage 27 slides along rails 28 to accommodate the feed of the tubing through the corrugating head 21.

At the right-hand end of the apparatus shown in FIG. 1, a stand 61 with roller 62 is provided on the main frame 24 to support the corrugated outbye end of the tubing as it comes from the corrugating head 21.

Figure 9:
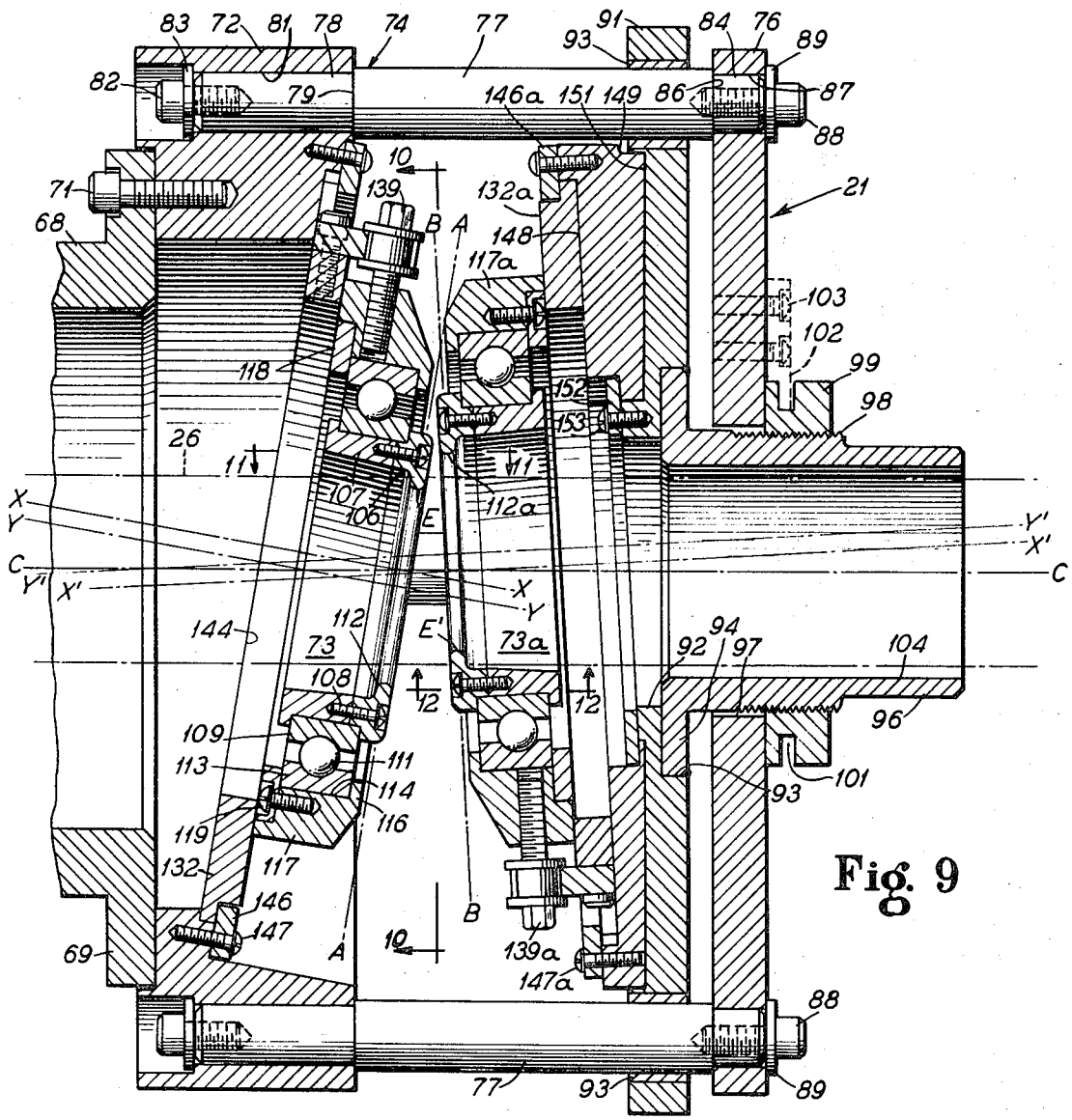
FIG. 9 is an enlarged fragmentary longitudinal cross sectional view of FIG. 8 taken along the line 9—9.

As shown in FIG. 1, the corrugating head 21 has a left-hand, inbye extension 63 rotatably supported in bearings 64 within the journal frame body portion 32. The corrugating head is rotatably driven by a belt 66 trained between driving pulley 39 and a driven pulley groove 67 in an intermediate cylindrical drive section 68. As best shown in FIGS. 4 and 9, the drive section 68 is fastened by a flange 69 and bolts 71 to a relatively heavy, circular, die-mounting disc 72.

Thus, the corrugating head 21 is mounted for rotation about the tubing while the latter is held from turning by the clamp carriage 27. The tubing moves from left to right wherever it is shown in the drawings.

Figure 8:
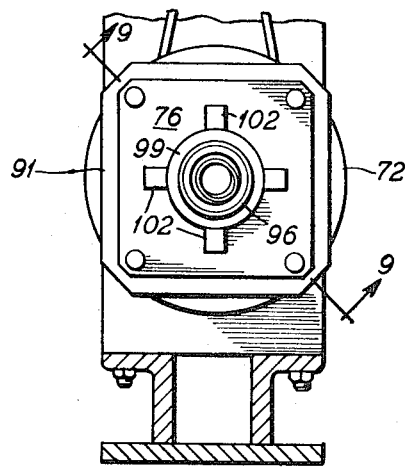
FIG. 8 is a view similar to FIG. 3 but, as shown in FIGS. 9 and 10, has a different internal arrangement which will simplify and facilitate a desciption and understanding of the present invention.

Refer now to FIGS. 8, 9 and 10. In FIG. 9 the internal parts are shown in a setting which facilitates a clear description and understanding of the oblique nature of the supports for the annular die rings which comprises an important part of the present invention. The die setting as shown in FIG. 9 is an initial step toward the operative position of FIG. 4 to produce a helical corrugation. Use and operation can be most readily described and understood by first referring to the arrangement of FIG. 9, then to FIG. 4.

As shown in FIG. 9, the die section 74 of the corrugating head 21 comprises identical first and second annular die rings 73 and 73a encompassing the tubing 26. The die rings are rotatable about inclined axes Y—Y and Y'—Y'. They are respectively supported in planes A—A and B—B which are oblique or skewed with respect to the tubing axis C—C.

The die section 74 comprises end plates 72 and 76 spaced apart by a plurality of (in this case four) rods 77. As described above, end plate 72 is a relatively heavy annular disc bolted to the intermediate driving section 68. Each spacer rod 77 has a reduced diameter left end portion 78 providing a shoulder 79 engaging the inside of disc 72 and is held snugly in a bore 81 by a screw 82 and washer 83.

Similarly, at its right-hand end, each rod 77 has a reduced diameter portion 84 providing a shoulder 86 engaging the inside of end plate 76 and held snugly within a bore 87 by a screw 88 and washer 89. As shown in FIG. 8, the end plate 76 is square with its corners slightly beveled.

Axial adjustment of the spacing between the die rings along axis C—C is provided by a slide plate 91 having a central aperture 92 through which the tubing extends. It is bored in four places and fitted with bushings 93 which are slideably mounted on rods 77.

The slide plate 91 is counter-bored at 93 to receive a welded flange 94 of a central, axial tubular extension 96 which extends through a central aperture 97 formed in the end plate 76. Extension 96 has an external threaded surface 98 receiving an axial adjustment nut 99. The latter has an external groove 101 receiving radially inwardly extending pawls or fingers 102 which are fitted in four places about the end plate and are attached by screws 103.

The axial position of the slide plate 91 and of the second die ring 73a can be adjusted toward or away from the first annular die ring 73 merely by turning nut 99 in one direction or the other. The inner bore 104 of the tubular extension 96 is preferably slightly larger than the external diameter of the finished corrugated tubing. Thus the extension 96 functions both to adjust the spacing between the die rings 73, 73a and to serve as a run-out guide for the finished corrugated tubing.

The first and second annular die rings and the parts immediately supporting them may be identical and are here so shown. Accordingly, the first annular die ring will be described in detail and such description will apply to corresponding portions of the second annular die ring which will be referred to by the same reference characters followed by the subscript a.

Annular die ring 73 comprises two section 106 and 107 clamped together by screws 108 onto the inner race 109 of a ball bearing 111. Die section 106 is preferably hardened for long wear and has an inner annular peripheral portion 112 which, when suitably eccentrically adjusted as will be described, bears on the exterior of tubing 26.

The tubing-engaging inner annular periphery 112 of the *first* annular die ring 73 is disposed in the abovementioned oblique plane A—A and indentably bears on the tubing exterior in that plane. Likewise, the tubing-engaging inner annular periphery 112a of the *second* annular die ring is located in the above-mentioned oblique plane B—B and bears on the tubing exterior in that plane.

It will be apparent as this description proceeds that a function of the first annular die ring is to indent the tubing and generate a helical corrugation therein, and a function of the second annular die ring is to modify the pitch of the corrugation. By suitably adjusting the inner eccentric area of each die ring in its own respective oblique plane, one set of such adjustments being shown in FIG. 4, helical corrugated tubing can be produced in accordance with the present invention.

The outer race 113 of each ball bearing 111 is mounted in a recess 114 adjacent a retaining flange 116 in an eccentrically adjustable plate or disc 117. A retaining ring 118 held by screws 119 supports the outer race 113 against axial displacement. Referring to FIGS. 5 and 9, the accentrically adjustable plates or rings 117, 117a may be, and are here shown as, identical. 117 supports the first annular die ring 73 and 117a supports the second annular die ring 73a. Each has a polygonal shape as shown in FIG. 5 and defined by top edges 121, 122, bottom edges 123, 124 and 126, and parallel side edge portions 127, 128.

Each side edge portion 127, 128 comprises a relatively thin, straight slide flange 129 along a straight abutment surface 131 having somewhat greater thickness. This provides for eccentric adjustment of the plate 117 and the first annular die ring 73 carried thereby, relative to circumferentially adjustable mounting discs now to be described. As seen in FIG. 5, eccentric adjustment of the eccentrically adjustable mounting plate or ring 117 is in the direction of the eccentric axis D—D. This moves the eccentric point E toward and away from the tubing 26 to vary the indentable effect on it.

For the utmost of selectivity in determining the shape and pitch of the helical corrugations, each annular die ring should have its inner periphery 112 or 112a eccentrically adjsutable in its oblique plane A—A or B—B throughout a broad range of radial directions. In the present case, to illustrate the wide range of adjustments available with the present invention, each annular die ring is adjustable eccentrically toward and away from the tubing along a line which can adjusted circumferentially a full 360° about the tubing. It will be obvious upon a full understanding of the invention that such wide range of circumferential adjustability is not necessary in production machinery. In some cases 180° or 90° would provide sufficient adjustability for the production requirements of the machine.

In the present case, in addition to the eccentric adjustment of the die rings 73, 73a due to the eccentric adjustability of their respective mounting plates 117, 117a each die ring is also circumferentially adjustable a full 360° about the tubing axis C—C by rotation of a circumferentially adjustable mounting disc 132, 132a on which the corresponding eccentrically adjustable plate 117, 117a is mounted.

As shown in FIG. 9, the corresponding circumferentially adjustable mounting discs 132, 132a are respectively rotatably adjustable about the axes X—X and X'—X'. The spacing between X—X and Y—Y corresponds to the eccentricity of die ring 73 relative to the tubing 26; and, likewise, the spacing between X'—X' and Y'—Y' corresponds to the eccentricity of die ring 73a. As best shown in FIG. 9, the axis of circumferential adjustment X—X meets the axis of rotation C—C in the first oblique plane A—A; and, likewise, axis X'—X' meets C—C in the second oblique plane B—B. This is the preferred construction but it will be obvious that some departure from this axial/planar arrangement may be made within the scope of the invention.

In the present case, both circumferentially adjustable mounting discs 132, 132a are identical, thus only 132 which is best shown in FIG. 5 will be described.

As shown in FIGS. 5 and 9, each circumferentially adjustable mounting disc 132, 132a encompasses the tubing 26 and has at opposite sides a pair of spaced parallel guides 133 affixed as by bolts 134, guidably engaging the side flanges 129 and abutment edges 131 of the corresponding eccentrically adjustable plate 117 or 117a.

Circumferentially adjustable disc 132 has an inwardly overhanging bracket 136 fast by screws 137 and has an open ended slot 138 for an adjusting screw 139. The latter has a pair of axially spaced flanges 141, 142 respectively engaging opposite faces of the bracket 136 and is threaded into the eccentrically adjustable plate 117 as by threads 143. As the adjusting screw 139 is turned, the plate 117 is moved within slide guides 133 to vary its eccentricity relative to circumferentially adjustable disc 132. This will vary the eccentricity of the corresponding die ring 73 relative to the axis C—C. The axis of screw 139 may be considered the axis of eccentric movement, this eccentric axis being adjustable a full 360° with rotational adjustment of the plate 132.

Refer to FIGS. 5 and 9. Circumferentially adjustable mounting disc 132 is held against skewed or oblique surface 144 in supporting disc 72 by an annular friction locking ring 146 fastened by screws 147. The skewed surface 144 is parallel to oblique plane A—A. By releasing screws 147 to back off locking ring 146, the circumferentially adjustable plate 132 and the first die ring 73 carried thereby can be rotated a full 360° to any desired circumferential adjustment about the tubing.

Circumferentially adjustable mounting disc 132a, for the *second* annular die ring 73a, is held against a skewed or oblique surface 148 in an auxiliary mounting disc 149 carried by the slide plate 91. A friction locking ring 146a held by screws 147a enables the circumferentially adjustable mounting disc 132a and plate 117a and the second die ring 73a carried thereby to be turned and locked at any desired circumferential position about the tubing. The skewed surface 148 is parallel to oblique plane B—B.

Auxiliary mounting disc 149 is held against a surface 151 on the slide plate 91. A friction locking ring 152 held by screws 153 enables the auxiliary mounting disc 149 (and the disc 132a and second die ring 73a) to be turned and locked at any desired circumferential position throughout a range of 360° about the tubing. The surface 151 is preferably normal to the tubing axis C—C, so rotational adjustment of the auxiliary mounting disc 149 will not change the angle of oblique plane B—B relative to the tubing axis C—C.

Adjustment of the annular die rings 73 and 73a from the simplified positions shown in FIG. 9 to the operative positions shown in FIG. 4 will now be described.

As shown in FIG. 9, the first die ring 73 has been shifted downward in oblique plane A—A, parallel to an eccentric axis passing through the adjustment screw 139 until the point of maximum, inward eccentricity E is well within the surface of tubing 26. Likewise, the second die ring 73a has been shifted upward in oblique plane B—B parallel to an eccentric axis coinciding with the adjusting screw 139a until the point of maximum inward eccentricity E' is well within the surface of tubing 26, and on the opposite side. Points E and E' are in the same vertical plane in FIGS. 9 and 10 and are 180° apart around the tubing.

As shown schematically, in FIGS. 11 and 12 respectively, the die ring eccentric zone flanking the eccentric point E of the first annular die ring is at a right angle to the tubing axis C—C; and the die ring eccentric zone flanking the eccentric point E' of the second annular die ring is also at a right angle to axis C—C.

Thus, if the tubing 26 were held against rotation by clamp carriage 27, and the corrugating head 21 with the die rings arranged as per FIG. 9 were rotated, die rings 73 and 73a would generate annular grooves 154 and 154a as shown in FIG. 13. Because the die rings are at right angles to the tubing axis C—C, as described above in connection with FIGS. 11 and 12, there would be no tendency to feed the tubing forward from the first die ring 73 to the second die ring 73a and therefore no helical corrugation would be generated.

To change the die ring adjustment from the condition of FIG. 9 to that of FIG. 4, it is necessary only to loosen locking rings 146 and 146a and shift the circumferentially adjustable mounting rings 132 and 132a, clockwise as seen in the direction of arrows 10—10 in FIG. 9 an amount less than 180°, and make suitable adjustment of the die spacing nut 99 for the particular corrugation shape and pitch desired.

In the present case, as illustrated in FIG. 10, each ring 73 and 73a is shown shifted 45° clockwise, that is, from axial plane 9—9 to plane 4—4 shown in FIG. 10.

This operative condition, longitudinally cross-sectioned along plane 4—4 of FIG. 10, is shown in FIG. 4.

Referring now to FIGS. 6 and 7, which are comparable to FIGS. 11 and 12 except that they relate to FIG. 4 instead of FIG. 9, note that the first and second die rings, at their eccentric points E and E' are skewed relative to the tubing axis C—C. Note that both die rings 73 and 73a cross the axis C—C at an angle other than 90°. Note also that angle M in FIG. 6 is greater than angle N in FIG. 7. In the actual operating condition shown in FIG. 4, angle M may be about 8° and angle N about 4°, this being occasioned by the fact that the indenting die 73 is preferably skewed at a greater angle than the second die 73a to enable the second die ring to exert a backward compressive force on the side wall of the corrugation to effectively modify its pitch.

Use and operation will now be described in connection with the working arrangement of FIG. 4.

When the clamp cylinder 53 is actuated to keep the tubing 26 from rotating, and when the gear motor 38 is started to rotate the corrugating head clockwise as seen in the direction of the arrows 5—5 in FIG. 4, the first annular die ring 73 will progressively indent a helical groove 156 into the tubing and feed it to the right in FIG. 4. By suitably adjusting the axial spacing nut 99, the spacing between the annular die ring 73 and 73a may be set to cause the latter to exert a hold-back compression on the ridge 157 alongside the groove. This will modify the shape of the corrugation and reduce its pitch to that desired for the end product.

The corrugation is thus continually compressed between the die rings, to accomplish the desired pitch reduction and modification, by angling the first annular die ring 73 to feed tubing forward faster than the second annular die ring 73a is set to propel it forward. To this end, as seen in FIGS. 6 and 7, angle M is greater than angle N for the purposes described.

It will be obvious that all the adjustable features shown in the present disclosure will not be required in a production machine which is set up to make the same kind of corrugation in same size tubing. For example, referring to FIG. 4, once the angles and eccentricity and spacing of the dies have been determined for the corrugation desired, a production machine could be made without any circumferential or eccentric adjustment for the second die ring 73a at all. In actual practice, mounting ring 132a and auxiliary mounting ring 149 have been successfully combined in one piece.

An important feature of the present invention can be explained by reference to FIGS. 9 and 10. If the eccentric portion E of the first die ring is at the circumferential position shown in FIG. 9, it will be oriented at a right angle to tubing axis C—C as seen in FIG. 11, therefore will have no tendency to feed the tubing forward and no spiral corrugation will be generated. Now, if, leaving all other factors the same as shown in FIG. 9, locking ring 146 is loosened and circumferentially adjustable ring 132 is rotated 45° clockwise as seen in FIG. 10, the eccentric portion E will cross the surface of the tubing at an angle M as seen in FIG. 6. And if the mounting ring 132 is shifted 90°, then the angle M as seen in FIG. 6 will be even larger, in fact this will be the largest angle that can be achieved because further shifting of mounting ring 132 beyond the 90° position *decreases* the angle M until, if the portion E were moved circumferentially a full 180°, angle M would again be reduced to zero and again no helical corrugation would be generated.

Thus, the angle of generation of the helical corrugation, and its pitch, can be varied from zero to maximum to zero by moving the eccentric portion E from the position shown in FIG. 9 to a point 180° clockwise from that position. Operation and adjustment of the second die ring 73a follows the same principles outlined for 73.

All of the above considerations would involve *clockwise* rotation of the head about the tubing as seen from the right in FIG. 9.

It should be observed here in concluding the description of the principles of operation that moving the eccentric portion E counterclockwise relative to the head from the position shown in FIG. 10 (or in FIG. 9 looking in the direction or arrows 10—10) would cause the tubing to be fed in the wrong direction, namely backward.

While one form in which the present invention may be embodied has been shown and described it will be understood that various modifications may be made within the spirit and scope of the invention as defined by the appended claims.

We claim as our invention:

1. In apparatus for helically corrugating metal tubing having a corrugating head mounted for rotation about the tubing, and at least one freely rotatable annular die ring eccentrically supported on the head and having a portion adapted to encompass and to engage the tubing, improved mounting means for the die ring including:

means for adjusting the helix angle by moving the mounting means in a plane which is oblique to the rotational axis of the head, circumferentially of the head, to change the angle of the line of contact of the tubing-engaging portion of the die ring relative to the surface of the tubing and the rotational axis of the head.

2. In apparatus for helically corrugating metal tubing having a corrugating head mounted for rotation about the tubing, and at least one annular die ring supported by the head and adapted to encompass the tubing said die ring having a tubing-engaging portion, improved mounting means for supporting the annular die ring in the head including:

a mounting ring supported on the head for circumferential adjustment of the tubing-engaging portion of the die ring relative to the head in a plane which is oblique to the rotational axis of the head;

said die ring being eccentrically supported on the mounting ring to engage the exterior of the tubing.

3. In apparatus for helically corrugating metal tubing according to claim 2 in which the die ring is eccentrically adjustable relative to the rotational axis of the head.

4. In apparatus for helically corrugting metal tubing according to claim 3 in which the circumferential adjustment of the mounting ring and the eccentric adjustment of the die ring are separate to the extent that one is adjustable independently of the other.

5. In apparatus for helically corrugating metal tubing according to claim 3 in which the die ring is eccentrically adjustable in a plane which is parallel to said oblique plane.

6. In apparatus for helically corrugated metal tubing having a corrugating head mounted for rotation about the tubing, and at least one annular die ring supported by the head and adapted to encompass the tubing, improved mounting means for supporting the annular die ring in the head including:

said die ring being eccentric of the rotational axis of the head and having an inner annular tubing-engaging periphery adapted to encompass the tubing and freely rotatable in a plane which is oblique to said axis;

and means for mounting the die ring in the head including circumferential adjustment means effective to move the mounting means circumferentially relative to the head in a plane which is substantially parallel to said oblique plane.

7. In apparatus for helically corrugating metal tubing according to claim 6, eccentric adjustment means for moving said inner, annular, tubing-engaging periphery eccentrically of the tubing in said oblique plane throughout a range of circumferentially adjusted positions of the means for mounting the die ring in the head.

8. In apparatus for helically corrugated metal tubing having a corrugating head mounted for rotation about the tubing, and at least one annular die ring supported by the head and adapted to encompass the tubing, improved mounting means for supporting the annular die ring in the head including:

said die ring having an inner tubing-engaging periphery adapted to encompass the tubing;

an eccentrically adjustable mounting ring supporting said die ring with the tubing-engaging periphery freely rotatable in a plane which is oblique to the rotational axis of the head;

a circumferentially adjustable mounting ring being supported on the head;

eccentric adjustment and guide means acting between the mounting rings for adjusting and guiding the tubing-engaging periphery through a range of eccentric positions relative to said axis;

said circumferentially adjustable mounting ring being circumferentially adjustable relative to the head about an axis which is substantially normal to said oblique plane.

9. In apparatus for helically corrugating metal tubing according to claim 8, said head having a surface substantially parallel to said oblique plane, said circumferentially adjustable mounting ring abutting said surface and being circumferentially movable about said surface, and means for locking said mounting ring in selected positions against said surface.

10. In apparatus for helically corrugating metal tubing having a corrugating head mounted for rotation about the tubing, and at least one annular die ring supported by the head and adapted to encompass the tubing, improved mounting means for supporting the annular die ring in the head including:

said die ring having an inner tubing-engaging periphery adapted to encompass the tubing and being freely rotatable in a plane which is oblique to the rotational axis of the head;

an eccentrically adjustable mounting ring supporting and guiding said die ring for eccentric adjustment relative to the head along an axis of eccentrically which is generally transverse to the head;

a circumferentially adjustable mounting ring supported on the head and supporting said eccentrically adjustable mounting ring for circumferential adjustment therewith;

said circumferentially adjustable mounting ring being circumferentially adjustable relative to the head in a direction to move said axis of eccentricity through a range of positions in said oblique plane.

11. In apparatus for helically corrugating metal tubing according to claim 10 in which the circumferentially adjustable mounting ring is circumferentially movable for adjustment in a plane which is parallel to said oblique plane.

12. In apparatus for helically corrugating metal tubing having a corrugating head mounted for rotation about the tubing, a pair of freely rotatable, annular die rings spaced apart along the rotational axis of the head and adapted to encompass the tubing, each die ring being eccentrically supported on the head and having a portion adapted to engage the tubing, improved mounting means for the die rings including:

means in a plane which is oblique to the rotational axis of the head which is responsive to circumferential movement of the mounting means for each die ring relative to the head to change the angle of the line of contact of the tubing-engaging portion of the respective die ring relative to the surface of the tubing and the rotational axis of the head, for modifying the corrugation generated in the tubing.

13. In apparatus for helically corrugating metal tubing having a corrugating head mounted for rotation about the tubing, and a pair of annular die rings supported by the head and adapted to encompass the tubing at locations spaced along the rotational axis of the head, improved mounting means for supporting the annular die rings in the head comprising:

each annular die ring having a tubing-engaging inner portion freely rotatable in a plane which is oblique to said axis;

a pair of mounting rings supported by the head at locations spaced along said axis, each being circumferentially adjustable about the head in a direction which is parallel to said oblique plane;

each of said die rings being eccentrically supported on a corresponding one of said mounting rings to engage the exterior of the tubing in an attitude determined by the circumferential adjustment of the corresponding mounting ring.

14. In apparatus for helically corrugating metal tubing according to claim 13 in which each die ring is eccentrically adjustable relative to the tubing throughout a range of circumferentially adjusted positions of its corresponding mounting ring.

15. In apparatus for helically corrugating metal tubing according to claim 13, means for adjusting the spacing between die rings along the rotational axis of the head.

16. In apparatus for helically corrugating metal tubing having a corrugating head mounted for rotation about the tubing, and first and second annular die rings eccentrically supported by the head and adapted to encompass the tubing at locations spaced along the rotational axis of the head for respectively generating a helical corrugation and modifying the pitch thereof, improved mounting means for supporting the annular die rings in the head comprising:

the first and second die rings having tubing-engaging inner portions freely rotatable respectively in first and second oblique planes which obliquely intersect said axis;

first and second mounting rings supported by the head and respectively supporting said first and second die rings;

said first and second mounting rings being circumferentially adjustable about the head respectively in directions which are parallel to said first and second oblique planes;

the first oblique plane being at a lesser angle relative to said axis than the second oblique plane.

References Cited

UNITED STATES PATENTS

| | | | |
|---|---|---|---|
| 2,724,422 | 12/1955 | Siegerist | 72—119 |
| 3,353,389 | 11/1967 | Kelstrom | 72—77 |
| 3,128,821 | 4/1964 | Andersen | 72—77 |

FOREIGN PATENTS

| | | |
|---|---|---|
| 91,223 | 5/1959 | Holland. |
| 201,252 | 2/1956 | Australia. |

CHARLES W. LANHAM, Primary Examiner

A. L. HAVIS, Assistant Examiner

U.S. Cl. X.R.

72—119

PO-1050
(5/69)

UNITED STATES PATENT OFFICE
CERTIFICATE OF CORRECTION

Patent No. 3,543,551     Dated December 1, 1970

Inventor(s) RAISCH, Lee S.; and FALKENBERG, Howard M.

It is certified that error appears in the above-identified patent and that said Letters Patent are hereby corrected as shown below:

Col. 4, line 41, "abovementioned" should be --above-mentioned--

Col 5, line 6, "adjsutable" should be --adjustable--.

Col. 8, line 14, insert a comma (,) after "tubing".

Col. 9, line 24, "eccentrically" should be --eccentricity--.

SIGNED AND
SEALED
FEB 9 1971

(SEAL)
Attest:

Edward M. Fletcher, Jr.
Attesting Officer

WILLIAM E. SCHUYLER, J
Commissioner of Patent